United States Patent

[11] 3,538,916

| [72] | Inventors | Joseph S. Wiles<br>Baltimore;<br>Herbert R. Groff, Street, Maryland |
|---|---|---|
| [21] | Appl. No. | 785,188 |
| [22] | Filed | Dec. 19, 1968 |
| [45] | Patented | Nov. 10, 1970 |
| [73] | Assignee | The United States of America as represented by the Secretary of the Army |

[54] INJECTION PISTOL
13 Claims, 1 Drawing Fig.

[52] U.S. Cl................................................. 128/217,
124/38; 128/264
[51] Int. Cl............................................... A61m 05/00,
A61m 05/22, A61m 31/00
[50] Field of Search........................................ 128/217,
221, 264; 124/27, 28, 38(Browne)

[56] References Cited
UNITED STATES PATENTS

| 937,078 | 10/1909 | Laudermilch................ | 124/27 |
| 1,347,622 | 7/1920 | Deininger.................... | 128/217 |
| 1,473,507 | 11/1923 | Obermaier................... | 124/38UX |
| 2,043,677 | 6/1936 | Salomon....................... | 124/38UX |
| 2,952,256 | 9/1960 | Meader et al................. | 128/221 |
| 3,402,712 | 9/1968 | Eisenhand.................... | 128/217 |

*Primary Examiner*—Samuel Koren
*Assistant Examiner*—James H. Czerwonky
*Attorney*—Harry M. Saragovitz, Edward J. Kelly, Herbert Berl and Bernard J. Ohlendorf ABSTRACT: An injection pistol for intramuscular implantation of encapsulated liquid or solid chemical material into animals. An injection needle is removably mounted on a frame, the depth of injection of the needle into the animal muscle is controlled by an injection depth gauge mounted on the injection needle. A shaft means having a slidable plunger means integral therewith is mounted on the frame and is utilized to eject the chemical material from within the injection needle and implant the chemical material into the animal muscle after the needle is thrust into the muscle. The travel of the plunger means within the injection needle is limited by a threadedly adjustable depth stop means mounted on the end of the shaft means opposite to the plunger means.

Patented Nov. 10, 1970
3,538,916
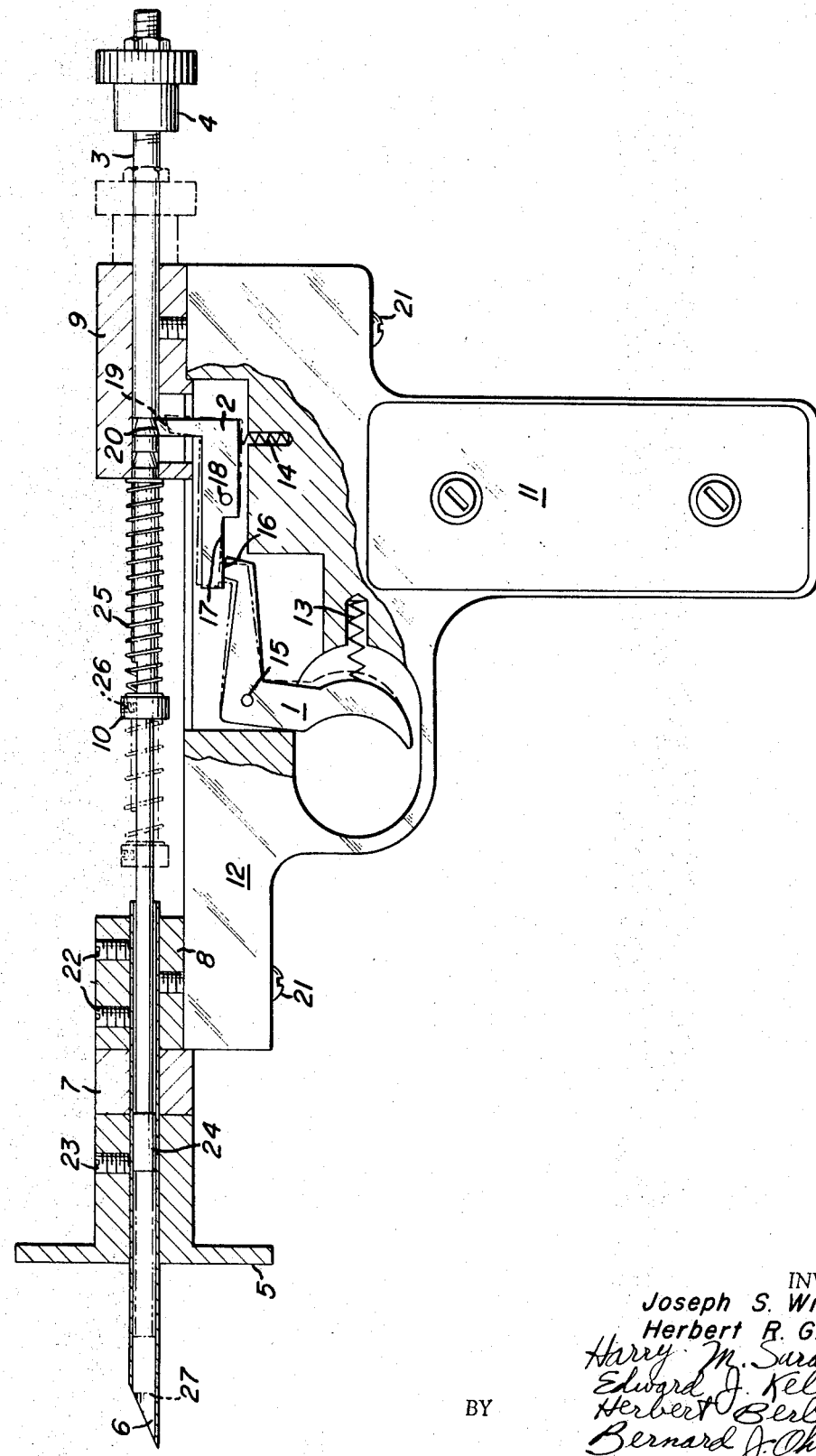
INVENTORS
Joseph S. Wiles
Herbert R. Groff
BY Harry M. Saragovitz
Edward J. Kelly
Herbert Berl
Bernard J. Ohlendorf
ATTORNEYS 3,538,916

INJECTION PISTOL

DEDICATORY CLAUSE

The invention described herein may be manufactured, used, and licensed by or for the Government for governmental purposes without the payment to us of any royalty thereon.

SPECIFICATION

Our invention relates to an injection pistol for intramuscular implantation of liquid (encapsulated) or solid chemical materials into animals.

Prior art implantation techniques required the use of surgical procedures to place a carrier containing the chemical material to be implanted into the muscle of the animal. The surgical procedure required an incision to be made into the muscle by a scalpel, manually placing the chemical carrier within the incision by means of a pair of pliers, and closing the wound by suturing to retain the chemical carrier within the incision. Such prior art surgical procedure required special skill and technique so that large blood vessels would not be severed, and the procedure often led to excessive bleeding and great trauma. Further problems associated with the prior art surgical problem were that the procedure was too slow and tedious; resulted in an animal wound larger than necessary to produce the desired results; lacked means to control an exact or consistent depth of material implant; and required more than one person to perform, especially on larger animals.

The above discussed problems led to the conception and reduction to practice of our invention.

A principal object of our invention is to provide an injection pistol which will enable intramuscular implantation of chemical materials in animals by one person with facility, speed, accuracy, and minimal wound size.

Another object of our invention is to provide an injection pistol which will enable intramuscular implantation of chemical materials in animals by one person without excessive bleeding and trauma; without the necessity for surgical procedure; and with facility, speed, accuracy, and minimal wound size.

A further object of our invention is to provide an injection pistol which will enable intramuscular implantation of chemical materials in animals by one person without excessive bleeding and trauma; without the necessity for surgical procedure; without requiring any special skill or technique; and with facility, speed, accuracy, and minimal wound size.

Other objects will be obvious from or will appear in the specification hereinafter set forth.

The drawing shows our injection pistol which will be described in detail as follows.

Our pistol is made of stainless steel and designed as a spring loaded and triggered sear discharge apparatus. A conventional pistol frame 12 having a conventional handle 11 is provided. Trigger 1 is pivotally mounted by pin 15 within frame 12 so that trigger 1 is held under spring tension by spring 13, the spring being utilized to return the trigger to its front position (shown by solid lines in the drawing) after firing of the pistol. End 16 of the trigger contacts end 17 pivotally mounted sear 2, the sear being pivotable on pin 18. Sear 2 is held under spring tension produced by sear spring 14, the sear spring being utilized to return the sear to the horizontal position (shown by the solid lines in the drawing) after the pistol has been fired and to position sear surface 19 within shaft slot 20 when the pistol is armed. Surface 19 of the sear is chambered at a slight angle to mate with slot 20 within shaft 3, the mating being the state when the pistol is armed as stated above. Front bearing block 8 and rear bearing block 9 are fixedly mounted to frame 12 by screw means 21. Injection needle 6 is removably mounted within front bearing block 8 by means of setscrews 22. Various size diameter injection needles can be interchangeably mounted in bearing block 8 within the skill of the art to compensate for the size of the animal, the particular muscle being injected, and the size of dosage being administered. Spacer 7 is removably mounted by friction fit on injection needle 6 and contacts bearing block 8 and frame 12; the spacer being utilized as a rough adjustment to limit the amount of travel of needle 6 within the animal muscle, some applications may not require using the spacer. A variety of sizes of spacers can be utilized in increments from a fraction of an inch up to several inches within the skill of the art depending on the size of the animal being administered and the particular muscle being injected. Depth gauge 5 is removably mounted on injection needle 6 and in contact with spacer 7 by means of setscrew 23; the depth gauge being utilized to contact the animal outer surface and prevent needle 6 from penetrating the muscle any deeper. Shaft 3 is slidably mounted within bearing block 9 and has plunger 24 integral therewith and slidably located within needle 6. Adjustable depth stop 4 is threadably mounted on the end of shaft 3 to provide adjustment for the desired distance of travel of shaft 3 to prevent extension of the shaft past surface 27 of needle 6. Shaft 3 is held under spring tension by means of spring 25; the tension of spring 25 being adjustable by moving collar 10 along shaft 3 to the desired point and fixing the location of the collar on the shaft by means of setscrew 26. The tension of spring 25 determines the speed with which plunger 24 travels to inject the chemical material into the animal muscle and the tension is adjustable within the skill of the art depending on the particular animal being injected, the particular muscle being injected, and particular chemical material and dosage being administered. To use our pistol the particular spacer is selected and needle travel limited and stop 4 adjusted as described above; a container, such as a conventional inert capsule which dissolves in body fluids (not shown in the drawing) containing the solid or liquid chemical material to be injected into the animal is placed within needle 6; shaft 3 is drawn to the rear by grasping stop 4 until surface 19 of sear 2 snaps into slot 20 of shaft 3; the container containing the chemical material is then permitted to slide down needle 6 to contact plunger 24 simply by tilting the pistol at an angle; the needle is then thrust into the animal muscle up to depth gauge 5, the distance of travel having been limited as described above; trigger 1 is then squeezed to the position shown by the broken lines in the drawing which causes sear 2 to pivot to the position shown by the broken lines for the sear in the drawing; pivoting of sear 2 removes surface 19 from notch 20 and permits shaft 3 to slide forward and deposit the chemical material within the animal muscle by means of plunger 24.

It is obvious that other modifications can be made of our invention, and we desire to be limited only by the scope of the appended claims.

We claim:

1. A pistol for intramuscular implantation of encapsulated liquid or solid chemical material in animals comprising a frame means; a handle means integral with the frame means; injection needle means having a sharp pointed end removably mounted on the frame means; injection gauge means mounted on the injection needle means; a shaft means mounted on the frame means; a plunger means integral with the shaft means and slidably located within the injection needle means; and depth stop means mounted on the end of said shaft means opposite to said plunger means, said depth stop means being threadably adjustable so as to limit the travel of said plunger means within said needle means.

2. The pistol of claim 1 wherein a trigger means is pivotally mounted within the frame means, said trigger means being adapted to pivot a sear means and disengage the sear means from a notch means on said shaft means; a trigger spring means is provided to maintain the trigger means under spring tension; said sear means is pivotably mounted within the frame means adjacent to the trigger means; said sear means comprises a sear spring means to maintain the sear means under spring tension; and a shaft spring means is mounted on said shaft means to maintain the shaft means under spring tension.

3. The pistol of claim 2 wherein the notch means and sear means each have a surface which is chambered at a slight angle, the chambered surface of the notch means being parallel to the chambered surface of the sear means.

4. The pistol of claim 2 wherein a collar means is movably mounted on the shaft means, said collar means being adapted to adjust the tension of the shaft spring means.

5. The pistol of claim 4 wherein the collar means is fixedly located at a point on the shaft means by setscrew means.

6. The pistol of claim 1, wherein the travel of said plunger means is limited to the pointed end of the injection needle means.

7. The pistol of claim 1 wherein a first bearing block means is fixedly mounted to the frame means by screw means, said first bearing block means being adapted to mount the injection needle means.

8. The pistol of claim 7 wherein the injection needle means is removably mounted within the first bearing block means by setscrew means, the removable mount being adapted to interchange various sizes of injection needle means.

9. The pistol of claim 1 wherein the injection gauge means is removably mounted on the injection needle means by setscrew means.

10. The pistol of claim 1 wherein a spacer means is removably mounted by friction fit on the injection needle means between the first bearing block means and the injection depth gauge means.

11. The pistol of claim 1 wherein a second bearing block means is fixedly mounted to the frame means by screw means, said second bearing block means being adapted to mount the shaft means.

12. A method for intramuscular implantation of encapsulated liquid or solid chemical material in animals using the pistol of claim 1 comprising the steps of providing a pistol frame means and handle means integral with the frame means; mounting an injection needle means on the frame means, said needle means having a sharp pointed end; mounting an injection depth gauge means on the ejection needle means; adjusting the depth gauge means to provide a predetermined distance of travel for the injection needle means; mounting a shaft means on the frame means, said shaft means having a plunger means integral therewith and located within the injection needle means; mounting a threadably adjustable depth stop means on the shaft means; placing the chemical material to be implanted in an animal within the injection needle means; thrusting the injection needle means into a muscle of the animal to the predetermined distance of travel; moving the shaft means forward to implant the chemical material in the muscle of the animal.

13. The method of claim 12 wherein the shaft means is moved forward under spring tension by releasing a sear means from a notch means in the shaft means, said sear means being released by a trigger means.